United States Patent
Schmidl et al.

(10) Patent No.: US 9,294,316 B2
(45) Date of Patent: Mar. 22, 2016

(54) SCRAMBLING SEQUENCES FOR WIRELESS NETWORKS

(75) Inventors: Timothy M. Schmidl, Dallas, TX (US); Anuj Batra, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 336 days.

(21) Appl. No.: 13/168,180

(22) Filed: Jun. 24, 2011

(65) Prior Publication Data

US 2011/0317779 A1  Dec. 29, 2011

Related U.S. Application Data

(60) Provisional application No. 61/358,250, filed on Jun. 24, 2010.

(51) Int. Cl.
*H04L 27/28* (2006.01)
*H04L 25/03* (2006.01)
*H04L 27/26* (2006.01)

(52) U.S. Cl.
CPC ....... *H04L 25/03866* (2013.01); *H04L 27/2601* (2013.01)

(58) Field of Classification Search
CPC ....... H04L 1/0057; H04L 1/0041; H04L 9/00; H04L 1/0072; H04L 47/10; H04L 43/50; H04W 84/12

USPC .......................................................... 370/252
See application file for complete search history.

(56) References Cited

U.S. PATENT DOCUMENTS

| | | | | |
|---|---|---|---|---|
| 6,883,717 | B1 * | 4/2005 | Kelley et al. .................. | 235/492 |
| 2002/0031167 | A1 * | 3/2002 | Hamamoto .................... | 375/130 |
| 2002/0172179 | A1 * | 11/2002 | Grimsrud ....................... | 370/342 |
| 2003/0125015 | A1 * | 7/2003 | Inoue et al. .................... | 455/411 |
| 2003/0145196 | A1 * | 7/2003 | Heegard et al. ................ | 713/150 |
| 2004/0128589 | A1 * | 7/2004 | Lewis ............................ | 714/700 |
| 2009/0116472 | A1 * | 5/2009 | Chang et al. .................. | 370/350 |
| 2009/0122987 | A1 * | 5/2009 | Mo et al. ....................... | 380/277 |
| 2011/0176443 | A1 * | 7/2011 | Astely et al. ................... | 370/252 |
| 2011/0317779 | A1 * | 12/2011 | Schmidl et al. ................ | 375/260 |

OTHER PUBLICATIONS

IEEE Draft Standard for Local and Metropolitan Area Networks, Part 15.4: Low-Rate Wireless Personal Area Networks (WPANs), 802.15. 4g standard, New York, New York, May 2011, 212 pages.

* cited by examiner

*Primary Examiner* — Sulaiman Nooristany
(74) *Attorney, Agent, or Firm* — John R. Pessetto; Frank D. Cimino

(57) ABSTRACT

An integrated circuit includes logic configured to generate scrambling sequences, each based on a different scrambling seed, for a smart-utility-network data packet communication. A Hamming distance between any two scrambling sequences is half the length of a PSDU of the data packet or greater.

18 Claims, 2 Drawing Sheets

| NUMBER OF OFDM SYMBOLS | | | | |
|---|---|---|---|---|
| M | | L | 6 BITS | VARIABLE |
| STF | LTF | PHY HEADER | PSDU | TAIL | PAD |
| SHR | | PHR | PHY PAYLOAD | |

FIG. 1a

| | | NUMBER OF OFDM SYMBOLS | | | |
| --- | --- | --- | --- | --- | --- |
| | | M | L | 6 BITS | VARIABLE |
| STF | LTF | PHY HEADER | PSDU | TAIL | PAD |
| SHR | | PHR | PHY PAYLOAD | | |

FIG. 1b

| RATE 5 BITS | RESERVED 1 BIT | LENGTH 11 BITS | RESERVED 2 BIT | SCRAMBLER 2 BITS | RESERVED 1 BIT | HCS 8 BITS | TAIL 6 BITS |
| --- | --- | --- | --- | --- | --- | --- | --- |

SCRAMBLING SEQUENCES FOR WIRELESS NETWORKS

CROSS-REFERENCE TO RELATED APPLICATION

The present application claims priority to U.S. Provisional Patent Application No. 61/358,250, filed on Jun. 24, 2010; which is hereby incorporated herein by reference.

BACKGROUND

Wireless personal area networks ("WPANs") are used to convey information over relatively short distances. Unlike wireless local area networks ("WLANs"), WPANs need little or no infrastructure, and WPANS allow small, power-efficient, and inexpensive solutions to be implemented for a wide range of devices. Smart Utility Networks ("SUNs") may operate either over short ranges such as in a mesh network where utility meter information is sent from one utility meter to another or over longer ranges such as in a star topology where utility meter information is sent to a poletop collection point. The terms WPAN and SUN are used interchangeably in this document.

In some cases, a scrambled data packet sent over a SUN may not be received successfully. The sender may be informed that the data packet has not been successfully received and thus the sender attempts to retransmit the data packet. However, the scrambling sequence may be the cause of the unsuccessful receipt. Thus, if the data packet is retransmitted with the same or a similar scrambling sequence, it is possible that the receipt will again be unsuccessful.

SUMMARY

Systems for implementing smart utility networks are described herein. In at least some disclosed embodiments, an integrated circuit includes logic configured to generate scrambling sequences, each based on a different scrambling seed, for a smart-utility-network data packet communication. A Hamming distance between any two scrambling sequences is half the length of a PSDU of the data packet or greater.

In yet other disclosed embodiments, a device includes a processor and transceiver coupled to the processor. The transceiver includes a physical layer for smart-utility-network data packet communication. The processor is configured to generate scrambling sequences, based on a scrambling seed, for a data packet transmitted by the transceiver. A Hamming distance between any two scrambling sequences is half the length of a PSDU of the data packet or greater.

In other disclosed embodiments a machine-readable storage medium includes executable instructions that, when executed, cause one or more processors to generate scrambling sequences, each based on a different scrambling seed, for a smart-utility-network data packet communication. A Hamming distance between any two scrambling sequences is half the length of a PSDU of the data packet or greater.

These and other features and advantages will be more clearly understood from the following detailed description taken in conjunction with the accompanying drawings and claims.

BRIEF DESCRIPTION OF THE DRAWINGS

For a more complete understanding of the present disclosure, reference is now made to the accompanying drawings and detailed description, wherein like reference numerals represent like parts:

FIGS. 1A-1B illustrate a packet format and packet header format, respectively, in accordance with various embodiments;

NOTATION AND NOMENCLATURE

Figure 2:
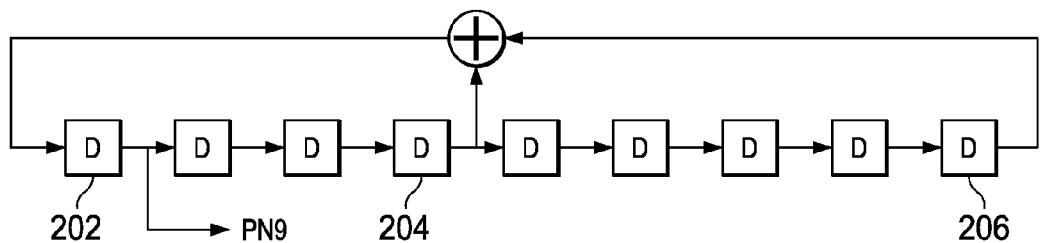
FIG. 2 illustrates an integrated circuit configured to produce a scrambling sequence, in accordance with various embodiments.

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer to an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one having ordinary skill in the art will understand that the following description has broad application, and the discussion of any is meant only to be exemplary of that embodiment, and not intended to intimate that the scope of the disclosure, including the claims, is limited to that embodiment.

In wireless communications, a scrambler is used to reduce the probability of having long strings of zeroes or ones and to whiten the transmitted data (i.e., to make the transmitted data appear more random.) Scrambled data packets appear unintelligible to a listener lacking an appropriate descrambling device. The scrambler may generate a scrambling sequence based on a scrambling seed. In some cases, depending on the scrambler architecture, certain input sequences (i.e., data packets), when combined with the scrambling sequence, may result in a scrambled data packet containing a long string of 0s or 1s or a bias to having more 0s or more 1s, which may increase the likelihood of an error when receiving the data packet. In the case of such a receipt error, the data packet must be retransmitted. However, if the data packet is retransmitted using the same scrambling sequence, a similar receipt error is likely. In accordance with various embodiments, when a data packet is retransmitted, a different scrambling sequence (or the scrambling seed used to generate the scrambling sequence) is selected to minimize the likelihood of a receipt error upon retransmission. In some embodiments, choosing a scrambling sequence with a large Hamming distance (i.e., the number of positions at which the corresponding bits are different) when compared to the original scrambling sequence reduces the likelihood of a receipt error upon retransmission.

A WPAN or low-rate WPAN is a simple, low-cost communication network that allows wireless connectivity in applications with limited power and relaxed throughput requirements. The main objectives of a WPAN are ease of installation, reliable data transfer, short-range operation, low cost, reasonable battery life, and a simple but flexible protocol.

Some characteristics of an illustrative WPAN are:

Over-the-air data rates of 800 kb/s, 600 kb/s, 400 kb/s, 300 kb/s, 250 kb/s, 200 kb/s, 150 kb/s, 100 kb/s, 75 kb/s, 50 kb/s, 40 kb/s, and 20 kb/s Star or peer-to-peer or mesh operation Allocated 16-bit short or 64-bit extended addresses Optional allocation of guaranteed time slots Carrier sense multiple access with collision avoidance channel access Low power consumption Energy detection Link quality indication 16 channels in the 2450 MHz band, 30 channels in the 915 MHz band, and 3 channels in the 868 MHz band.

These characteristics are not requirements, and each WPAN may deviate from the characteristics in one or more ways. Two different device types can participate in a WPAN: a full-function device ("FFD") and a reduced-function device ("RFD"). The FFD can operate in modes such as serving as a personal area network ("PAN") coordinator or a device. A FFD can communicate with RFDs or other FFDs while a RFD can only communicate with a FFD. More information can be found at IEEE Std. 802.15.4-2006 available at http://www.ieee802.org/15/pub/TG4.html, which is hereby incorporated by reference.

A utility network or smart utility network ("SUN") is a low-rate (e.g., 40 kbps to 1 Mbps), low-power WPAN that is designed for applications such as utility metering applications to transmit electricity, gas, and water usage, and other like data from the customer premises to a data collection point operated by the utility. For example, utility meters are installed for each residence in a residential neighborhood, and the usage data is sent periodically from each utility meter to a data collection point, which is an element of the WPAN. The data collection point is connected by fiber, copper wire, or wireless connection to a central office that collects all the usage data for a region. Usage data is sent either directly from each utility meter to the collection point or from utility meter to utility meter until the collection point is reached in a star or mesh network formation, respectively.

Orthogonal frequency division multiplexing ("OFDM") is a modulation technique that can be used for the physical layer of the SUN. Table 1 illustrates various OFDM options. Option 1 may be generated using a 128 point inverse fast Fourier transform ("IFFT"), Option 2 may be generated using a 64 point IFFT, and Options 3, 4, and 5 may be generated using 32, 16, and 8 point IFFTs, respectively. For oversampling, various sizes of IFFTs, such as 256 point, may be used in various embodiments. In accordance with various embodiments, the scrambler is used in the OFDM physical layer.

TABLE 1

| OFDM Options | | | | | | |
|---|---|---|---|---|---|---|
| | Option 1 | Option 2 | Option 3 | Option 4 | Option 5 | Unit |
| Sampling Rate | 1333333.33 | 666666.666 | 333333.333 | 166666.666 | 83333.3333 | Samp/sec |
| FFT size | 128 | 64 | 32 | 16 | 8 | |
| Tone Spacing | 10416.66667 | 10416.66667 | 10416.66667 | 10416.66667 | 10416.66667 | Hz |
| FFT Duration | 96 | 96 | 96 | 96 | 96 | microsec |
| Guard Interval | 24 | 24 | 24 | 24 | 24 | microsec |
| Symbol Duration | 120 | 120 | 120 | 120 | 120 | microsec |
| Symbol Rate | 8.33333333 | 8.33333333 | 8.33333333 | 8.33333333 | 8.33333333 | kSym/sec |
| Pilot-based Modulation | | | | | | |
| Active Tones | 104 | 52 | 26 | 14 | 7 | |
| # Pilots tones | 8 | 4 | 2 | 2 | 1 | |
| # Data Tones | 96 | 48 | 24 | 12 | 6 | |
| # DC null tones | 1 | 1 | 1 | 1 | 1 | |
| Approximate Signal BW | 1.09E+06 | 5.52E+05 | 2.81E+05 | 1.56E+05 | 8.33E+04 | Hz |
| BPSK ½ rate coded and 4x repetition | 100.00 | 50.00 | 25.00 | 12.50 | 6.25 | kbps |
| BPSK ½ rate coded and 2x repetition | 200.00 | 100.00 | 50.00 | 25.00 | 12.50 | kbps |
| BPSK ½ rate coded | 400.00 | 200.00 | 100.00 | 50.00 | 25.00 | kbps |
| BPSK ¾ rate coded | 600.00 | 300.00 | 150.00 | 75.00 | 37.50 | kbps |
| QPSK ½ rate coded | 800.00 | 400.00 | 200.00 | 100.00 | 50.00 | kbps |
| QPSK ¾ rate coded | 1200.00 | 600.00 | 300.00 | 150.00 | 75.00 | kbps |
| 16-QAM ½ rate coded | 1600.00 | 800.00 | 400.00 | 200.00 | 100.00 | kbps |
| 16-QAM ¾ rate coded | 2400.00 | 1200.00 | 600.00 | 300.00 | 150.00 | kbps |
| Raw rate (BPSK, no coding, no repetition) | 800.00 | 400.00 | 200.00 | 100.00 | 50.00 | kbps |
| Suggested Channel Spacing | 1200 | 600 | 400 | 200 | 100 | kHz |

FIGS. 1A and 1B illustrate a packet and packet header ("PHR"), respectively. A synchronization header ("SHR") comprises a short training field ("STF") and a long training field ("LTF"). As illustrated, the STF and LTF are four and two symbols long respectively, but each can be any size in various embodiments. The STF allows a WPAN device to perform automatic gain control ("AGC"), packet detection, fractional frequency offset estimation, de-assertion of clear channel assessment ("CCA") based on CCA modes (CCA Mode 1, 2, or 3), and coarse synchronization. The LTF allows a device to perform fine synchronization, integer frequency offset estimation, and perform channel estimation. The PHR can be any number of data symbols "M." In at least one embodiment, the PHR contains:

A Rate field specifying the data rate of the payload frame (5 bits);

One reserved bit after the Rate field;

A Frame Length field specifying the length of the payload (11 bits);

Two reserved bits after the Frame Length field;

A Scrambler field specifying the scrambling seed (2 bits);

One reserved bit after the Scrambler field;

A Header Check Sequence ("HCS"), an 8-bit cyclic redundancy check ("CRC") for the data fields only; and Six tail bits, which are all zeros, for Viterbi decoder flushing.

The PHR is encoded at the lowest data rate supported for each bandwidth option in at least one. The physical layer convergence protocol service data unit ("PSDU"), which can be any number of data symbols "L" or bits "N," carries a media access control ("MAC") sublayer frame, which comprises a MAC header, MAC payload, and MAC CRC in at least one. The PSDU also carries convolutional encoder tail-bits, which can be six zeros, and pad-bits if necessary to extend the data.

For OFDM, the STF and LTF fields comprise the preamble. The PSDU, tail bits, and pad bits are scrambled with a (possibly repeated) 511 length frame-synchronous scrambling sequence in at least one embodiment. The tail bits are then reset to all zeros. In some cases, data packets transmitted in the SUN may be relatively short (e.g., N is less than 80 bits). If a data packet is not received properly, the receiver may broadcast a request (NACK) to retransmit the data packet. However, if a similar scrambling sequence is used to scramble the PSDU, tail bits, and pad bits of the retransmitted data packet, the likelihood of improper receipt remains. Thus, in accordance with various embodiments, maximizing the Hamming distance between the scrambling sequences improves the likelihood of proper receipt upon retransmission of the data packet.

FIG. 2 shows a block diagram of an integrated circuit 200 that produces a scrambling sequence in accordance with various embodiments. The integrated circuit 200 may be alternately referred to as a "scrambler." The scrambler 200 comprises delay elements, including a left-most delay element 202. The delay elements of the scrambler 200 may be initially set to a pre-determined non-zero state based the scrambler field of the PHR. For example, the 2-bit scrambler field may specify the following four scrambling seeds, as shown below in Table 2.

TABLE 2

Scrambling seeds for PN9 scrambler

| Scrambler field MSB | Scrambler field LSB | Scrambling seed |
| --- | --- | --- |
| 0 | 0 | 0 0 0 0 1 0 1 1 1 |
| 1 | 0 | 0 0 0 0 1 1 1 0 0 |
| 0 | 1 | 1 0 1 1 1 0 1 1 1 |
| 1 | 1 | 1 0 1 1 1 1 1 0 0 |

The mapping of scrambler field value to scrambling seed may be stored in memory of a SUN device or hard-coded in the SUN device. One skilled in the art will appreciate that the scrambling seeds may be mapped to the scrambler field bits in other ways than shown above.

In accordance with various embodiments, a scrambling sequence is produced by initializing the scrambler 200 with the scrambling seed specified by the scrambler field. The leftmost value of the scrambling seed is placed in the leftmost delay element 202. The remaining values of the scrambling seed are placed in the following eight delay elements. In some embodiments, the scrambler 200 comprises a linear feedback shift register, where the label "PN9" represents the scrambling sequence output and the inputs to the XOR are the fourth delay element from the left 204 and the ninth delay element from the left 209. The output of the XOR is fed back into the leftmost delay element 202 and the value of each delay element shifts one delay element to the right. Thus, using the first scrambling seed as an example to illustrate the shifting operation and calculation of the output bits, the first four output bits (i.e., $PN9_0$ through $PN9_3$) are given by the following operations using the first scrambling seed, numbering bits from the left:

the fourth bit XOR the ninth bit (i.e., 0 XOR 1),
the third bit XOR the eighth bit (i.e., 0 XOR 1),
the second bit XOR the seventh bit (i.e., 0 XOR 1), and
the first bit XOR the sixth bit (i.e., 0 XOR 0)

This results in the first four bits of the scrambling sequence being 1,1,1, and 0.

When the scrambler 200 is initialized with the first scrambling seed (i.e., 0 0 0 0 1 0 1 1 1), the first 80 bits of the scrambling sequence generated by the scrambler 200 are:
1 1 1 0 0 1 1 0 0 0 0 1 0 0 1 0 0 0 1 0 1 0 1 1 1 0 1 0 1 1 1
1 0 0 1 0 0 1 0 1 1 1 0 0 1 1 1 0 0 0 0 0 0 1 1 1 0 1 1 1 0
1 0 0 1 1 1 1 0 1 0 1 0 0 1 0 1 0 0 0.

When the scrambler 200 is initialized with the second scrambling seed (i.e., 0 0 0 0 1 1 1 0 0), the first 80 bits of the scrambling sequence generated by the scrambler 200 are:
0 0 1 1 1 0 1 1 1 0 1 0 0 1 1 1 1 0 1 0 1 0 0 1 0 1 0 0 0 0 0
0 1 0 1 0 1 0 1 0 1 1 1 1 1 0 1 0 1 1 0 1 0 0 0 0 0 1 1 0 1
1 1 0 1 1 0 1 1 0 1 0 1 1 0 0 0 0 0 1.

When the scrambler 200 is initialized with the third scrambling seed (i.e., 1 0 1 1 1 0 1 1 1), the first 80 bits of the scrambling sequence generated by the scrambler 200 are:
0 0 1 1 1 1 0 1 0 1 0 0 1 0 1 0 0 0 0 0 0 1 0 1 0 1 0 1 0 1 1
1 1 1 0 1 0 1 1 0 1 0 0 0 0 0 1 1 0 1 1 1 0 1 1 0 1 1 0 1 0
1 1 0 0 0 0 0 1 0 1 1 1 0 1 1 1 1 1 0.

When the scrambler 200 is initialized with the fourth scrambling seed (i.e., 1 0 1 1 1 1 1 0 0), the first 80 bits of the scrambling sequence generated by the scrambler 200 are:
1 1 1 0 0 0 0 0 1 1 1 1 1 1 1 1 1 0 0 0 0 1 1 1 1 0 1 1 1 0 0
0 0 1 0 1 1 0 0 1 1 0 1 1 0 1 1 1 1 0 1 0 0 0 0 1 1 1 0 0 1
1 0 0 0 0 1 0 0 1 0 0 0 1 0 1 0 1 1 1.

Scrambled bits of the data packet are generated by an XOR operation of each bit of the PSDU, tail bits, and pad bits (collectively "input bits") with the scrambler sequence generated by the scrambler 200 using the scrambling seed identified by the scrambler field of the PHR. In other words, scrambled $bit_n$=input $bit_n$ XOR $PN9_n$. In some cases, retransmission of a data packet may be necessary. For example, generating the scrambled bits using a particular scrambler sequence may result in poor scrambling properties, such as having long strings of 0s or 1s or a sequence that does not appear to be white or random. Upon retransmission, altering the scrambler sequence used to generate the scrambled bits may reduce the likelihood of unsuccessful receipt since the input bits remain the same.

If retransmission is necessary, a different scrambling seed than the scrambling seed used to generate the particular scrambler sequence for the prior transmission is selected. In some embodiments, the MAC changes the scrambler seed by setting the scrambler field to "00" when the PHY is initialized and increments the scrambler field, using a 2-bit rollover counter, for each frame sent by the PHY. Thus, the scrambler field is "00" for the first frame sent, "01" for the second frame, "10" for the third frame, "11" for the fourth frame, and "00" for the fifth frame and so on. In other embodiments, the MAC sets the scrambler field to "00" whenever a packet is sent for the first time. When a first retransmission is requested for a packet because it was not received correctly, the field is incremented to "01". The scrambler field is set to "10" If a second retransmission is needed, "11" if a third retransmission is needed, and "00" for a fourth retransmission and so on.

As explained above, it is advantageous to maximize the Hamming distance between the scrambling sequences so that the data packet is more likely to be properly received upon retransmission. In a SUN, many shorter-length data packets are used to communicate control information and the like, such as acknowledgements (ACKs) or negative acknowledgements (NACKs). In accordance with various embodiments, diversity-enabled scrambling sequences are optimized to improve the likelihood that these short packets can be received successfully when retransmission is requested.

For the 80-bit scrambling sequences listed above, the Hamming distances from the first scrambling seed to the second, third and fourth scrambling seeds are 47, 46, and 45, respectively; the Hamming distances from the second scrambling seed to the third and fourth scrambling seeds are 45 and 46, respectively; and the Hamming distance from the third scrambling seed to the fourth scrambling seed is 47. By utilizing scrambling seeds that maximize the Hamming distance between scrambling sequences and, in particular, give a Hamming distance of about half of the length of the sequence or higher, short data packets benefit from a greater scrambling diversity if retransmission is necessary.

One skilled in the art will appreciate that other embodiments may, for example, utilize a different scrambler such as a PN7 scrambler having seven delay elements, which produces a 127 length repeating sequence. Additionally, other scrambling seeds may be selected that give Hamming distances between scrambling sequences of less than half of the length of the PSDU while still ensuring scrambling diversity if retransmission of a data packet is necessary.

Figure 3:
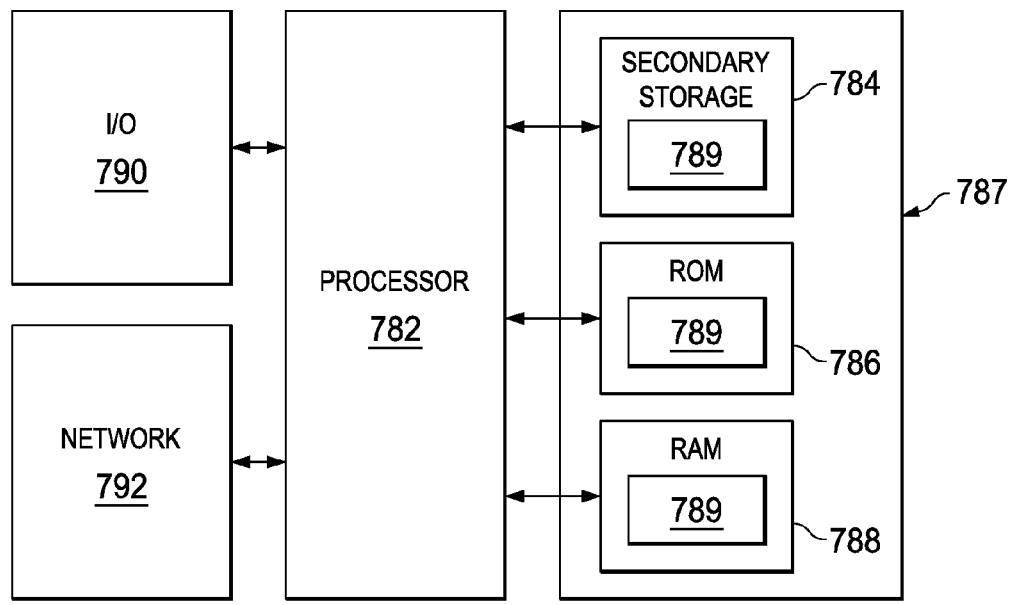
FIG. 3 illustrates a particular machine suitable for implementing one or more embodiments described herein.

The system described above may be implemented on a particular machine with sufficient processing power, memory resources, and network throughput capability to handle the necessary workload placed upon it. FIG. 3 illustrates a particular machine 780 suitable for implementing one or more embodiments disclosed herein. The computer system 780 includes one or more processors 782 (which may be referred to as a central processor unit or CPU) that are in communication with a machine-readable medium 787. The machine-readable medium 787 may comprise memory devices including secondary storage 784, read only memory (ROM) 786, and random access memory (RAM) 788. The processor is further in communication with input/output (I/O) 790 devices and network connectivity devices 792. The processor may be implemented as one or more CPU chips.

The secondary storage 784 is typically comprised of one or more disk drives, tape drives, or optical discs and is used for non-volatile storage of data and as an over-flow data storage device if RAM 788 is not large enough to hold all working data. Secondary storage 784 may be used to store programs and instructions 789 that are loaded into RAM 788 when such programs are selected for execution. The ROM 786 is used to store instructions 789 and perhaps data, which are read during program execution. ROM 786 is a non-volatile memory device that typically has a small memory capacity relative to the larger memory capacity of secondary storage. The RAM 788 is used to store volatile data and perhaps to store instructions 789. Access to both ROM 786 and RAM 788 is typically faster than to secondary storage 784.

I/O 790 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 792 devices may enable the processor 782 to communicate with an Internet or one or more intranets. With such a network connection, the processor 782 may receive information from the network, or may output information to the network in the course of performing the above-described method steps. Such information, which is often represented as a sequence of instructions 789 to be executed using processor 782, may be received from and output to the network, for example, in the form of a computer data signal embodied in a carrier wave Such information, which may include data or instructions 789 to be executed using processor 782 for example, may be received from and output to the network, for example, in the form of a computer data baseband signal or signal embodied in a carrier wave. The baseband signal or signal embodied in the carrier wave generated by the network connectivity 792 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions 789, codes, computer programs, scripts which it accesses from hard disk, floppy disk, optical disc (these various disk based systems may all be considered secondary storage 784), ROM 786, RAM 788, or the network connectivity devices 792.

In an alternative, the system may be implemented in an application specific integrated circuit ("ASIC") comprising logic configured to perform any action described in this disclosure with corresponding and appropriate inputs and outputs or a digital signal processor ("DSP") similarly configured. Such logic is implemented in a transmitter, receiver, or transceiver in various embodiments.

The above disclosure is meant to be illustrative of the principles and various of the present invention. Numerous variations and modifications will become apparent to those skilled in the art once the above disclosure is fully appreciated. Additionally, audio or visual alerts may be triggered upon successful completion of any action described herein, upon unsuccessful actions described herein, and upon errors. Also, the order of actions can be varied from order described, and two or more actions may be performed concurrently. It is intended that the following claims be interpreted to embrace all variations and modifications.

What is claimed is:

1. An integrated circuit, comprising:
    logic configured to generate scrambling sequences, each based on a different scrambling seed, for a smart-utility-network data packet communication;
    wherein when a retransmission is requested for a packet, a scrambling sequence different from the last scrambling sequence is used in the retransmission of the packet; and
    wherein when retransmission is requested for a packet, a media access control (MAC) changes a scrambler seed by setting a scramble field to "00" when a physical layer (PHY) is initialized and thereafter increments the scrambler field using a 2-bit rollover counter.

2. The integrated circuit of claim 1 wherein the length of a protocol service data unit (PSDU) is 80 bits or less.

3. The integrated circuit of claim 1 wherein the logic comprises a PN9 scrambler.

4. The integrated circuit of claim 3 wherein the scrambling seed is selected from the group consisting of: 000010111, 000011100, 101110111, and 101111100.

5. The integrated circuit of claim 1 wherein the logic comprises a PN7 scrambler.

6. The integrated circuit of claim 1 wherein the logic is implemented in an orthogonal frequency division multiplexing OFDM physical layer.

7. An apparatus, comprising:
    a transceiver with a physical layer for smart-utility-network data packet communication; and
    a processor coupled to the transceiver and configured to generate scrambling sequences, each based on a scrambling seed, for a data packet transmitted by the transceiver;
    wherein when a retransmission is requested for a packet, a scrambling sequence different from the last scrambling sequence is used in the retransmission of the packet; and
    wherein when retransmission is requested for a packet, a media access control (MAC) changes a scrambler seed by setting a scramble field to "00" when a physical layer (PHY) is initialized and thereafter increments the scrambler firld using a 2-bit rollover counter.

8. The apparatus of claim 7 wherein the length of the PSDU is 80 bits or less.

9. The apparatus of claim 7 wherein the processor generates the scrambling sequences using a PN9 scrambler.

10. The apparatus of claim 9 wherein the scrambling seed is selected from the group consisting of: 000010111, 000011100, 101110111, and 101111100.

11. The apparatus of claim 7 wherein the processor generates the scrambling sequences using a PN7 scrambler.

12. The apparatus of claim 7 wherein the physical layer is an orthogonal frequency division multiplexing (OFDM) physical layer.

13. A machine-readable storage device comprising executable instructions that, when executed, cause one or more processors to:
    generate scrambling sequence, each based on a different scrambling seed, for a smart-utility-network data packet communication;
    wherein when a retransmission is requested for a packet, a scrambling sequence different from the last scrambling sequence is used in the retransmission of the packet; and
    wherein when retransmission is requested for a packet, a media access control (MAC) changes a scrambler seed by setting a scramble field to "00" when a physical layer (PHY) is initialized and thereafter increments the scrambler field using a 2-bit rollover counter.

14. The machine-readable storage medium of claim 13 wherein the length of the protocol service data unit (PSDU) is 80 bits or less.

15. The machine-readable storage medium of claim 13 wherein the one or more processors generate the scrambling sequences by a PN9 scrambler.

16. The machine-readable storage device of claim 15 wherein the scrambling seed is selected from the group consisting of: 000010111, 000011100, 101110111, and 101111100.

17. The machine-readable storage device of claim 13 wherein the one or more processors generate the scrambling sequences by a PN7 scrambler.

18. The machine-readable storage device of claim 13 wherein scrambling sequences are generated in an orthogonal frequency division multiplexing (OFDM) physical layer.

* * * * *